United States Patent [19]

Pietzsch et al.

[11] Patent Number: 5,696,495
[45] Date of Patent: Dec. 9, 1997

[54] SYSTEM FOR CONTROLLING AND REGULATING A CONSTRUCTION INSTALLATION HAVING A PLURALITY OF COMPONENTS

[75] Inventors: Heinz Werner Pietzsch, Karlsruhe; Hans Bronk, Ettlingen, both of Germany

[73] Assignee: Pietzsch Automatisierungstechnik GmbH, Ettlingen, Germany

[21] Appl. No.: 696,329

[22] Filed: Aug. 13, 1996

Related U.S. Application Data

[63] Continuation-in-part of Ser. No. 654,194, May 28, 1996, abandoned, which is a continuation of Ser. No. 679,083, Jun. 3, 1991, abandoned and a continuation of PCT/EP90/01653 Oct. 2, 1990.

[30] Foreign Application Priority Data

Oct. 4, 1989 [DE] Germany .................. 39 33 060.0

[51] Int. Cl.⁶ .................................................. G05B 23/02
[52] U.S. Cl. .................................. 340/825.05; 370/235
[58] Field of Search ................. 340/825.01, 825.05, 340/825.06, 825.15, 825.16, 870.16, 870.18, 870.39; 379/106; 375/220, 221; 370/222, 235; 361/67, 68

[56] References Cited

U.S. PATENT DOCUMENTS

| | | | |
|---|---|---|---|
| 4,615,029 | 9/1986 | Hu et al. | 340/825.05 |
| 4,855,729 | 8/1989 | Takeuchi et al. | 340/825.05 |
| 4,996,703 | 2/1991 | Gray | 379/106 |
| 5,049,871 | 9/1991 | Sturgis et al. | 340/825.05 |

*Primary Examiner*—Jeffery Hofsass
*Assistant Examiner*—Andrew Hill
*Attorney, Agent, or Firm*—Collard & Roe, P.C.

[57] ABSTRACT

An apparatus for monitoring and controlling a complex construction installation from a local or remote location. Each of the functional components of the installation have slave processors associated therewith. The slave processors are coupled to a master and additional processing unit. A communication system for each of the functional components connects all of the functional elements within the components and enables a two way data communication between the master and additional processors and the communication systems. A single control unit coupled to the communication system enables the local, off-line monitoring and controlling of the installation. A remote decentralized routing station coupled to the communication system enables the remote, on-line monitoring and controlling of the installation.

8 Claims, 4 Drawing Sheets

SYSTEM FOR CONTROLLING AND REGULATING A CONSTRUCTION INSTALLATION HAVING A PLURALITY OF COMPONENTS

This is a continuation-in-part of application Ser. No. 08/654,194 filed May 28, 1996, abandoned, which is a continuation of Ser. No. 07/679,083 filed Jun. 3, 1991, abandoned, and International application PCT/EP90/01653 filed on Oct. 2, 1990 and which designated the U.S.

BACKGROUND OF THE INVENTION

1. Field of the Invention

The present invention relates to control and regulating devices. More particularly, it relates to a system for controlling and regulating a construction installation having a plurality of functional elements (i.e., components).

2. The Prior Art

U.S. Pat. No. 4,996,703 to Gray discloses a remote supervisory monitoring and control apparatus connected to monitored equipment. The apparatus shows a controlling and monitoring system operated from a control panel. An operator can use the control panel to selectively intervene in the current control process by means of a push-button telephone via the telephone network, for example by presetting voltage values. The operator can also change individual system parameters by remote control. In addition, the operator monitors the maintenance of preset limit or threshold values.

The device of Gray, however, does not allow on-line monitoring. The operator receives inquiry status reports of the process currently being executed, and can intervene, if necessary. Since the operator has to be able to monitor and control the installation in real time, the system of Gray is not suitable for remotely controlled operation.

In connection with the monitoring and controlling of complex installations with a great number of co-operating functional components, often times the operating personnel on site can become overstrained, at least temporarily. It is, therefore, desirable to have the capability of additionally monitoring and, if need be, also controlling the installation from a central station.

Therefore, the present invention is based on the problem of creating a system for controlling and regulating the monitoring of installations having a plurality of functional components, such as, for example, construction installations. Through the use of a ring type data bus, the system permits decentralized controlling and monitoring of the installation on-site, and real time remotely controlled operation and monitoring of the installation off-site.

The use of ring bus systems has been known in the field of communication technology for many years. U.S. Pat. No. 5,049,871, to Sturgis et al., discloses a two channel ring bus system within which the direction of the data flow is reversible. Sturgis requires the use of the two channels enable the reversal of the data flow.

U.S. Pat. No. 4,855,729 to Takeuchi et al, discloses a similar ring data bus system. This system is a computer network for valve control, whereby the computers each are connected with each other by fiber optic lines. The primary drawback with the system of Takeuchi, is that each connected computer first interprets the messages received before transmitting them further. This processing results in a loss of time which excludes the possibility of real-time monitoring and controlling as with the subject matter of the invention.

SUMMARY OF THE INVENTION

According to the invention, a control unit and routing station for on-line and off-line monitoring and controlling of the installation are connected to a communication system. The communication system connects the control unit and routing station to the functional components (elements) of the installation free of delay.

The communication system has a master processor with an additional processor unit, which are interfaced with the control unit and the routing station. The communication system includes a plurality of slave processors, each being in a controlling connection with the functional components of the installation. In addition, the slave processors are connected to a voltage output of the master processor The master processor has a voltage output with adjustable polarity, whereby the voltage applied to the voltage output is the supply voltage of the slave processors. The slave processors can be switched from receivers to transmitters depending on the polarity of their supply voltage.

The master and slave processors are connected to each other free of delay by a serial ring data bus for transmitting logic signals. The ring data bus is designed as a single-channel, bi-directional data bus.

The master processor is connected with one input and one output to the ring data bus, and through this feedback configuration, monitors the function of the ring data bus by comparing the input and output signals. The master processor presets the polarity of the supply voltage applied to the voltage output based on the feedback comparison, and thereby controls the operating mode of the slave processors.

The use of the communication system with a serial ring data bus permits controlling and monitoring of all functional elements connected to the communication system in real time.

In view of the fact that an on-site control unit and an off-site decentralized routing station are equally connected to the communication system, it is possible to control and monitor the installation with said systems. By using a ring data bus in which the data flow can be reversed in a targeted way, it is possible to limit and contain the failure of an individual functional component without endangering the other functional components and thus the overall function of the installation. In addition, the wiring expenditure is reduced by 50% as compared to known data bus systems.

The reversal of the direction of data flow takes place automatically. The master processor of the communication system compares the transmitted with the received signals and, in this way, recognizes whether the ring data bus is operating properly. In case of error, it reverses the direction of data flow within the ring data bus by changing the polarity of the supply voltage.

It is therefore an object of the present invention to provide a system for controlling and regulating a plurality of functional components that overcomes the shortfalls of the prior art.

It is another object of the invention to provide a system for controlling and regulating a plurality of functional components that has both on-site and off-site controls.

It is a further object of the invention to provide a system for controlling and regulating a plurality of functional components that enables monitoring and control of the functional components in real time.

Yet another object of the invention is to provide a system for controlling and regulating a plurality of functional components that utilizes a single, bi-directional ring type data bus for transmitting and receiving logic signals without delay.

BRIEF DESCRIPTION OF THE DRAWINGS

Other objects and features of the present invention will become apparent from the following detailed description considered in connection with the accompanying drawings, which disclose an embodiment of the present invention. It should be understood, however, that the drawings are designed for the purpose of illustration only, and not as a definition of the limits of the invention.

In the drawings, wherein similar reference characters denote similar elements throughout the several views.

DETAILED DESCRIPTION OF PREFERRED EMBODIMENTS

Figure 1:
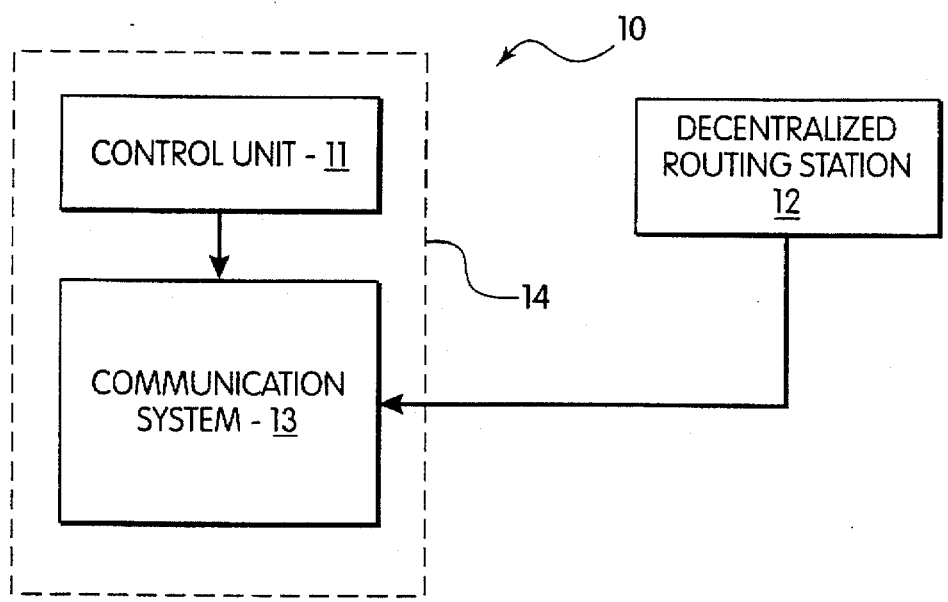
FIG. 1 is a block diagram of the system according to the invention.

FIG. 1 shows the system 10 according to the invention. A control unit 11 and a decentralized routing station 12 (e.g. computer controller) are connected to a communication system 13. The communication system 13 and the control unit 11 are components of an installation 14. Said installation 14 may be, for example, a construction machine with a great number of different functional elements, which are connected with each other by the communication system 13.

Figure 2:
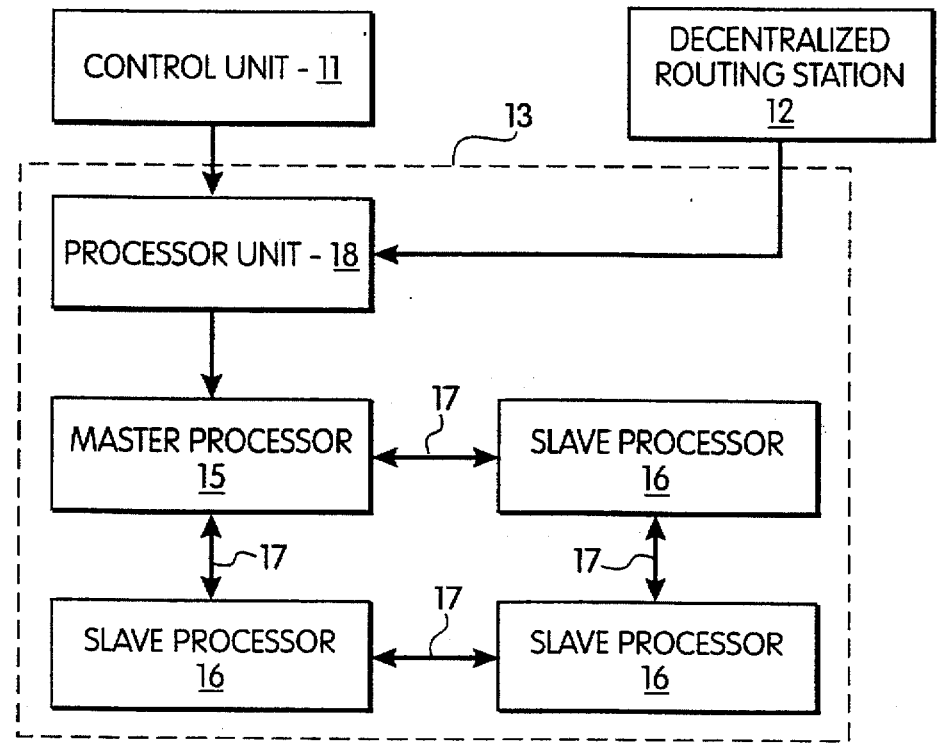
FIG. 2 is a more detailed block diagram of the system according to the invention.

FIG. 2 shows the communication system 13 according to the invention. Communication system 13 includes a master processor 15 and a plurality of slave processors 16, which are connected to each other via a serial bi-directional ring data bus 17. Master and slave processors 15 and 16 can be BOC51 FA-processors, or any other suitable known microprocessing devices. The slave processors 16 are coupled to the respective functional components being controlled and monitored (not shown).

Figure 5:
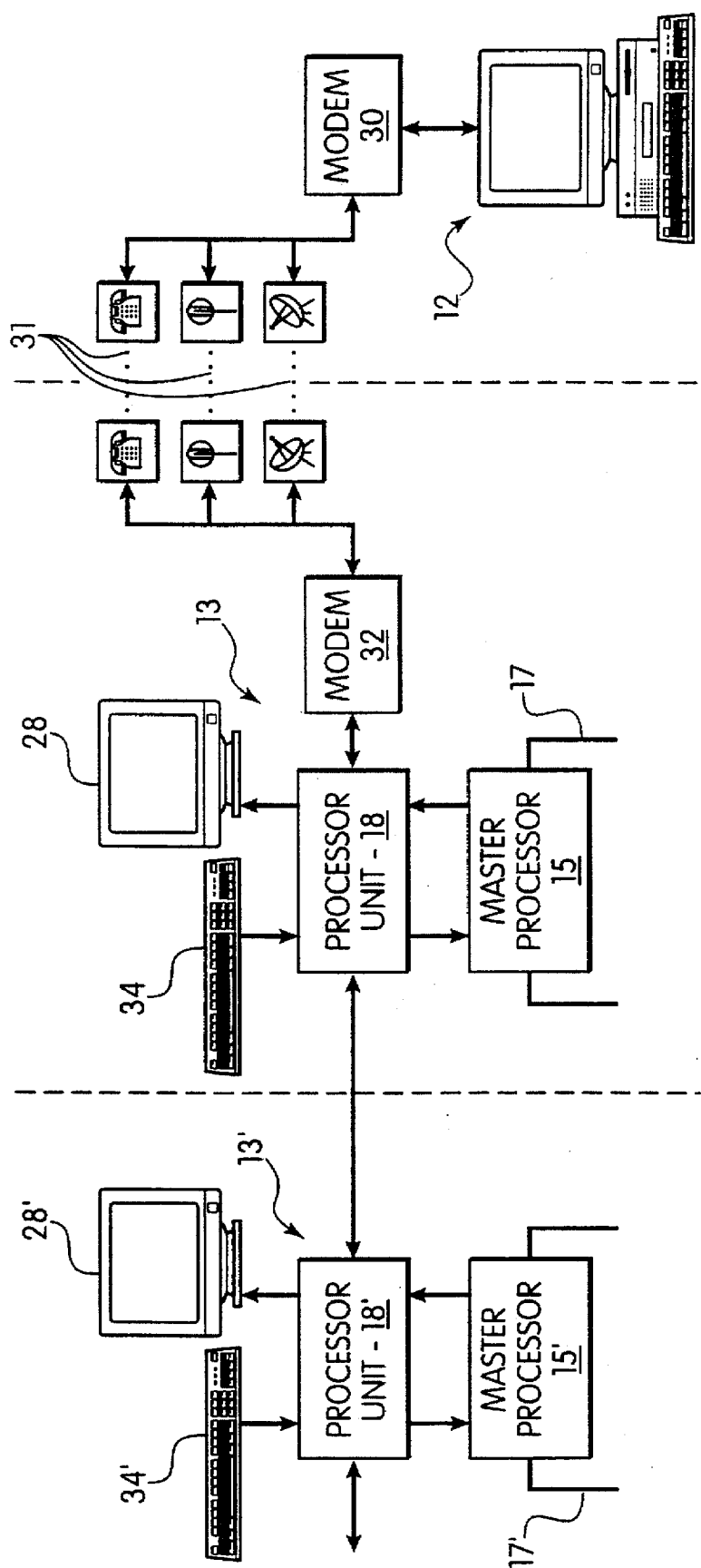
FIG. 5 is a block diagram of the installation system of the invention with a plurality of communication systems.

Master processor 15 is equipped with an additional processor unit 18, which is preferably designed as a CPU 68000, but may be designed with any other suitable known processor. Processor unit 18 has at least two interfaces for connection with control unit 11 and routing station 12. Routing station 12, which is located in a remote location with respect to installation 14, is connected via a modem 30 to a transmission network 31 such as, for example a telephone network, a radio network, or any other type of communication network (FIG. 5). The processor unit 18 is connected to the same communication network 31 via another modem 32. Thus, a genuine on-line connection exists between the communication system 13 and the routing station 12.

Figure 3:
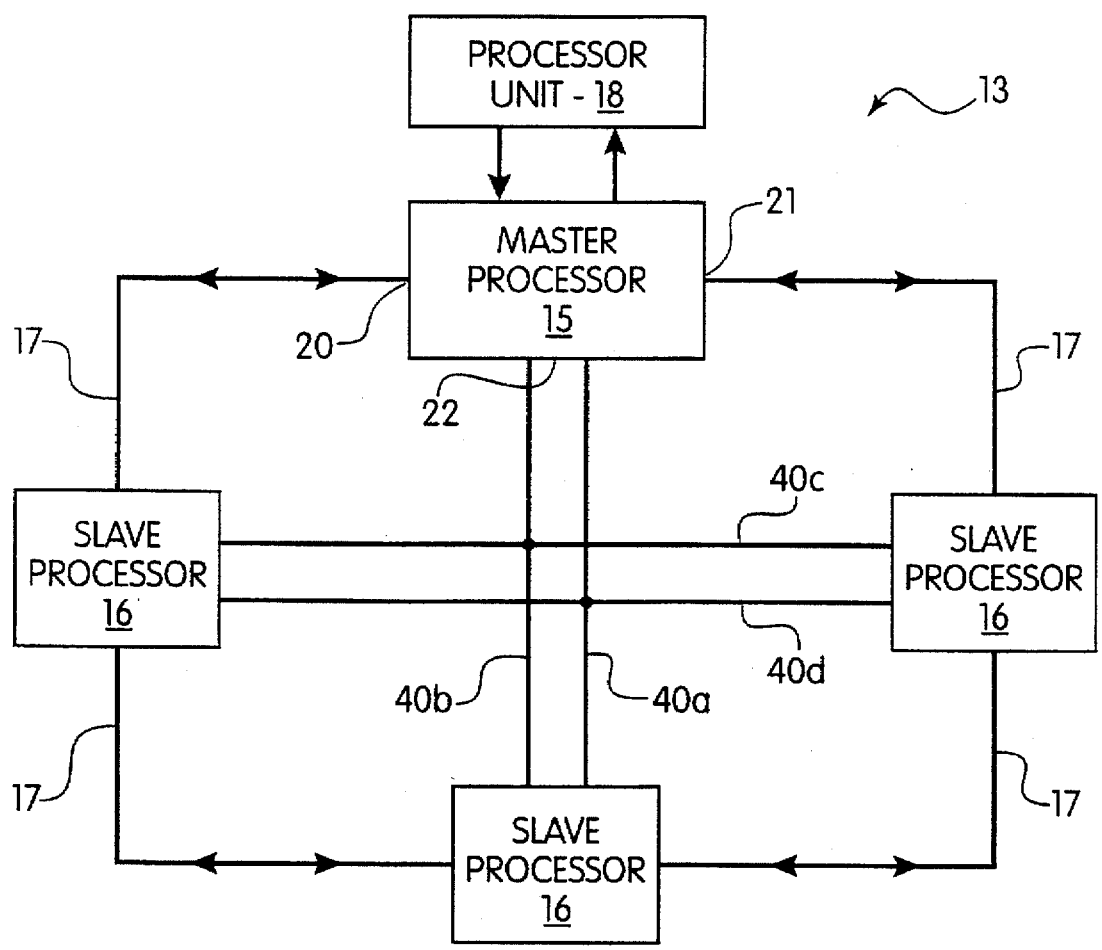
FIG. 3 is a block diagram of the communication system according to the invention.

FIG. 3 shows the communication system 13 according to the invention. System 13 includes a serial bi-directional ring data bus 17 to couple the slave processors 16 with master processor 15. Data bus 17 is designed as a single-channel bus. By using ring data bus 7, the wiring expenditure for monitoring and controlling the functional components (systems) connected to the slave processors 16 is reduced by almost half.

Through the use of central routing station 12 and the control unit 11, it is possible to directly address each of the individual functional components of the installation by selectively communicating with slave processors 16. Control routines can be queried, initiated, or changed. It is also possible to enter or change, via the ring data bus 17, not only individual control parameters, but also control programs or program modules. This feature is particularly important for retrofitting existing installations 14. For example, a large excavator can be fitted with a completely new type of gripping tool, and the respective control software can be retrofitted via ring data bus 17. It is also possible to install new display formats in existing video terminals.

Referring to FIG. 3, master processor 15 has a message input 20, a message output 21, and a voltage output 22. The supply voltage of the slave processors 16 is provided by coupling the slave processors to the voltage output 22 of master processor 15, via lines 40a–40d. The supply voltage is preferably 12 volts. Slave processors 16 are additionally connected in series to master processor 15, via ring data bus 17.

Master processor 15 receives the messages fed into the ring data bus 17 via the message output 21 on the message input 20. Thus, master processor 15 can "listen" to itself or in other words, monitor itself to determine the state of the data flow. In this case, ring data bus 17 is in tact.

In the event of an interruption of the data flow through ring data bus 17, the signals, if any, received on the message input 20 will differ from the messages entered. Master processor 15 no longer "hears" itself, and detects the error in the data flow path. This is an indication of an interruption of the data flow through ring data bus 17. Upon detection of this error, the polarity of the voltage applied to the voltage output 22 is changed. When the voltage polarity is changed at output 22, the polarity of the supply voltage of the slave processors 16 is also changed. As a result of the polarity change in supply voltage, the slave processors 16 previously acting as message receivers are changed to message transmitters, and vice versa. Thus, the direction of data flow within ring data bus 17 is reversed. Therefore, a slave processor 16 which can no longer be reached in one data flow direction can then be reached in the other data flow direction.

Figure 4:
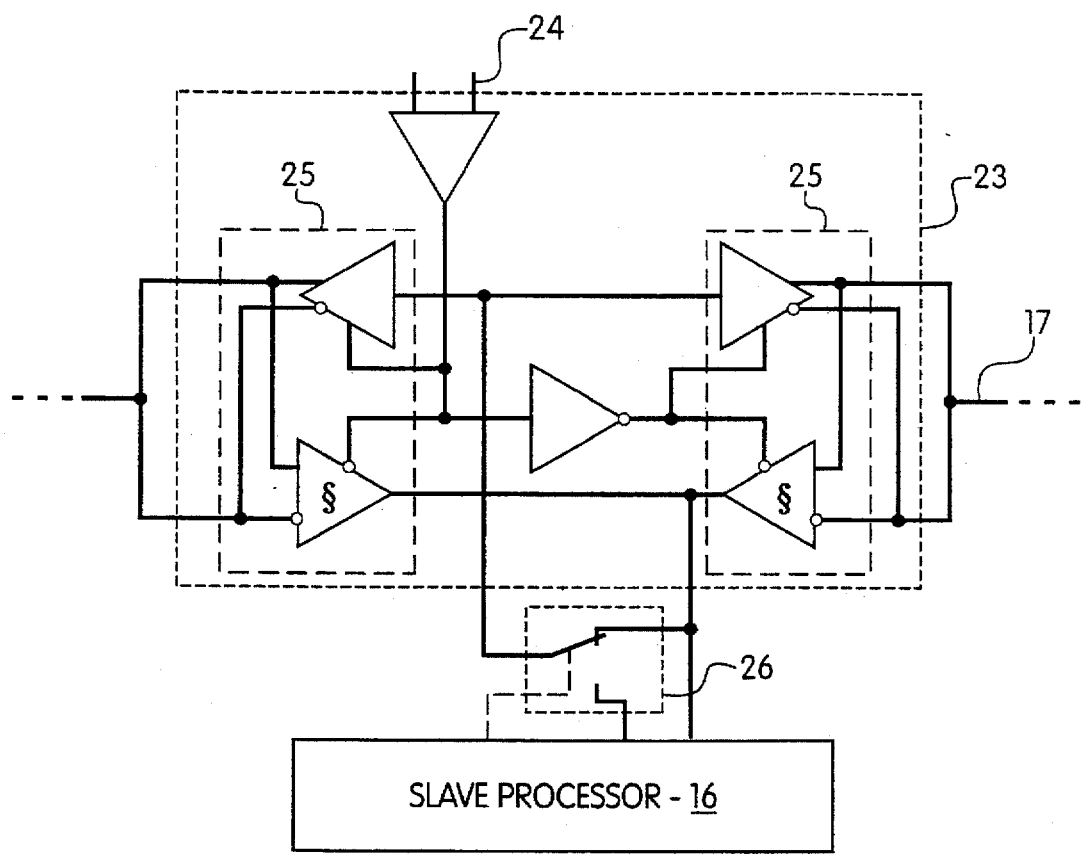
FIG. 4 is a schematic diagram of the interconnection of a slave processor with the communication system according to the invention.

According to FIG. 4, the slave processors 16 are connected in the ring data bus 17 not directly, but via a driver circuit 23. Driver circuit 23 enables the transmission of messages without delay. Driver circuit 23 has a voltage supply connection 24, which is connected to the voltage output 22 of master processor 15. Driver circuit 23 includes two amplifier circuits 25, which each consist of two NAND-gates. Amplifier circuits 25 are available as RS 422-modules, and usually act at a 12-volt level as transmitters or receivers depending on the polarity of the supply voltage applied to the voltage output 22. Reversing the operating state takes place via a multiplexer 26.

In addition, the use of the driver circuit 23, has the advantage that message signals are each amplified to the original maximum 5-volt (DC) signal level of logic signals. The signal quality is thus nearly constant within the entire bus system 17.

According to FIG. 5, it is possible to interconnect a plurality of communication systems 13, 13', etc. For this purpose, processors 18, 18' of the communication systems 13, 13', respectively, are connected with each other via corresponding interfaces. Normally, each component of the installation has its own communication system 13 or 13' for monitoring and controlling the functional elements associated with each component of the installation. The installation components can be controlled on-site from a control unit 34 or 34'. Video terminals 28 and 28' are provided for visual monitoring of the components of the installation. The component of the installation can be, for example a large excavator.

With the interconnection of the communication systems 13 and 13', each connected component of the installation can be controlled and monitored off-line (i.e., on-site) from one single control unit 34 or 34', respectively. Since control units 34 and 34' are coupled to the ring data buses 17 and 17', respectively, of the other components of the installation via processor units 18 and 18', respectively, it is possible to have only one operator control and monitor large excavators in a tandem operation with real-time control and real-time monitoring.

In addition, all components of the installation can be controlled or monitored on-line (i.e., off-site) remotely via the central routing station 12, because the central routing station is in direct real-time data connection with the two ring buses 17 and 17' via the processor unit 18 and 18', respectively. Routing station 12 is connected with a public or private communication network 31 such as, for example, a telephone network, satellite radio or other radio networks via a central modem 30, and with the processor unit 18 via a modem 32. The modem connections over communication network 31 enables the off-site, on-line controlling and monitoring of the installation components. In addition to processor unit 18', additional processor units of other components of the installation can be connected as well. The processor units may also be connected to each other via suitable modems and communication networks.

Therefore, the controlling and regulating device according to the invention permits controlling and monitoring of complex installations with a great number of different installation components in real time with minimal personnel requirements. In addition, the operational safety is increased as a result of the additional controlling and monitoring capability from a central routing station 12. Specially qualified personnel can be used in the central routing station 12 for controlling and monitoring a plurality of installation components.

While one embodiment of the present invention have been shown and described, it is to be understood that many changes and modifications may be made thereunto without departing from the spirit and scope of the invention as defined in the appended claims.

What is claimed is:

1. A controlling and regulating apparatus for monitoring and controlling an installation having a plurality of functional components, the device having at least one control unit for on-site monitoring and controlling, and having at least one decentralized routing station for remotely monitoring and controlling the installation off-site, the apparatus comprising:
    a communication system being coupled to the at least one control unit for off-line monitoring and controlling, and to the at least one central routing station for on-line monitoring and controlling of the installation, said communication system connecting the plurality of functional components with each other and further comprising:
        a first processor having interfaces coupled to the at least one control unit and the at least one routing station for receiving and sending control and monitoring information from and to the control unit and routing station;
        a master processor coupled to said first processor and having a message input, a message output and a voltage output, said voltage output having adjustable polarity;
        a serial ring data bus connected to said message input and output of said master processor, said serial ring data bus being a single-channel, bi-directional data bus for transmitting logic signals without delay;
        a plurality of driver circuits having outputs, and inputs coupled to said serial ring data bus;
        a plurality of slave processors coupled to said outputs of said plurality of driver circuits and thereby being in two-way communication with said master processor, each of said plurality of slave processors having a voltage supply input coupled to said voltage output of said master processor, said plurality of slave processors being switched between a receiving mode and a transmitting mode based on the polarity of said voltage supply, each of said plurality of slave processors being in controlling communication with one of the plurality of functional components; and
        said master processor monitoring and controlling the function of said serial ring data bus by comparing received output messages to received input messages and adjusting the polarity of said voltage output according to the compared information.

2. The apparatus according to claim 1, wherein said plurality of slave processors are individually and selectively addressable via said serial ring data bus.

3. The apparatus according to claim 1, wherein said plurality of driver circuits comprise signal amplifiers for amplifying logic signals received to a maximum logic level.

4. The apparatus according to claim 3, further comprising control programs and control parameters stored within said plurality of slave processors, the at least one control unit enabling the manipulation and exchange of said control programs and control parameters off-line, the at least one routing station enabling the manipulation and exchange of said control programs and control parameters on-line.

5. The apparatus according to claim 4, further comprising a communication system for each of the plurality of functional components, each communication system being in data communication with each other via said first and master processors.

6. The apparatus according to claim 5, wherein each of the plurality of functional installation components can be controlled by one control unit, and whereby each communication system associated with each of the plurality of functional components are connected as sub-communication systems to the first processor of said master processor.

7. The apparatus according to claim 5, wherein the functional installation components are construction machines which can be controlled and monitored on-line and off-line by means of a single control unit.

8. The apparatus according to claim 7, wherein the construction machines are cranes and large excavators.

* * * * *